United States Patent
Yamamoto et al.

(10) Patent No.: US 9,713,322 B2
(45) Date of Patent: Jul. 25, 2017

(54) FISHING ROD HAVING FITTING MOUNTED ON ROD BODY

(71) Applicant: Globeride, Inc., Tokyo (JP)

(72) Inventors: Hirokazu Yamamoto, Tokyo (JP); Takuji Kawamura, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 14/627,219

(22) Filed: Feb. 20, 2015

(65) Prior Publication Data
US 2015/0272096 A1   Oct. 1, 2015

(30) Foreign Application Priority Data

Mar. 27, 2014  (JP) ................................. 2014-065707
Mar. 27, 2014  (JP) ................................. 2014-065708

(51) Int. Cl.
*A01K 87/04*  (2006.01)
*A01K 87/00*  (2006.01)
*A01K 87/06*  (2006.01)

(52) U.S. Cl.
CPC .............. *A01K 87/00* (2013.01); *A01K 87/04* (2013.01); *A01K 87/06* (2013.01); *Y10T 29/49888* (2015.01)

(58) Field of Classification Search
CPC ......... A01K 87/00; A01K 87/04; A01K 87/06
See application file for complete search history.

(56) References Cited

U.S. PATENT DOCUMENTS

| 3,400,481 A | * | 9/1968 | Christenson | A01K 87/04 156/86 |
| 3,402,500 A | * | 9/1968 | Nelson | A01K 87/04 205/151 |
| 3,760,524 A | * | 9/1973 | Butler, Jr. | A01K 87/04 156/165 |
| 3,769,735 A | * | 11/1973 | Cousin | A01K 87/04 43/24 |

(Continued)

FOREIGN PATENT DOCUMENTS

| JP | 2004-194563 | 7/2004 |
| JP | 2005-229955 | 9/2005 |

(Continued)

OTHER PUBLICATIONS

Extended European Search Report dated Sep. 7, 2015 for European Patent Appln. No. 15156178.4.

(Continued)

*Primary Examiner* — Michael Wang
(74) *Attorney, Agent, or Firm* — Pillsbury Winthrop Shaw Pittman LLP (57) ABSTRACT

One object of the present invention is to provide a fishing rod wherein a fitting can be stably and securely fixed on a rod body with a mounting thread and cracking in a resin layer is less visible to a user. A fishing rod according to an embodiment of the present invention includes a rod body, a fitting mounted on an outer circumferential surface of the rod body via a mounting portion of the fitting, and a thread-like part-fixing member wound around the mounting portion and the rod body across a predetermined width in an axial direction of the rod body. On the surface of the part-fixing member is provided a cover member which may be opaque.

9 Claims, 6 Drawing Sheets

(56) References Cited

U.S. PATENT DOCUMENTS

| | | | | |
|---|---|---|---|---|
| 4,142,317 A * | 3/1979 | Klein | ............... | A01K 87/04 43/24 |
| 4,616,438 A * | 10/1986 | Ohmura | ............ | A01K 87/04 43/24 |
| 5,276,991 A * | 1/1994 | Stotesbury | ......... | A01K 87/04 43/24 |
| 5,361,529 A * | 11/1994 | Lindler | ............ | A01K 87/04 43/24 |
| 5,531,041 A * | 7/1996 | Betto | ............... | A01K 87/04 43/24 |
| 6,154,998 A * | 12/2000 | Hashimoto | ........ | A01K 87/04 43/24 |
| 6,219,954 B1 * | 4/2001 | Ohmura | ............ | A01K 87/04 43/24 |
| 2013/0097914 A1 * | 4/2013 | Barber | ............ | A01K 87/04 43/24 |

FOREIGN PATENT DOCUMENTS

| | | |
|---|---|---|
| JP | 2007-282530 | 11/2007 |
| JP | 2008-263841 | 11/2008 |
| JP | 2011-067123 | 4/2011 |

OTHER PUBLICATIONS

Office Action issued Mar. 28, 2017 in Japanese Application 2014-065707.

* cited by examiner

FISHING ROD HAVING FITTING MOUNTED ON ROD BODY

CROSS-REFERENCE TO RELATED APPLICATIONS

This application is based on and claims the benefit of priority from Japanese Patent Application Serial Nos. 2014-065707 (filed on Mar. 27, 2014) and 2014-065708 (filed on Mar. 27, 2014), the contents of which are hereby incorporated by reference in their entirety.

TECHNICAL FIELD

The present invention relates to a fishing rod having fittings mounted on rod body.

BACKGROUND

There are known fishing rods having fittings such as line guides and a reel seat mounted on a rod body. As disclosed in Japanese Patent Application Publication No. 2008-263841 (the "'841 Publication") and Japanese Patent Application Publication No. 2004-194563 (the "'563 Publication") for example, a conventional fitting is mounted on a rod body by winding a mounting thread around the rod body and a leg of the fitting placed on the outer circumferential surface of the rod body. In many fishing rods, the surface of the mounting thread wound around the rod body is coated with a resin layer to fix the fitting on the rod body.

In fishing rods having a fitting thus mounted, a large amount of bending of the rod body may cause a large load to be imparted on the fitting to produce cracking in the resin layer near a mounting portion of the fitting (e.g., the leg of a line guide). Such a problem has been pointed out in paragraph [0004] of the '841 Publication and paragraph [0005] of the '563 Publication. To address this problem, the '841 Publication discloses reinforcing the mounting portion by providing, near the mounting portion, a reinforcing member crossing the mounting thread. The '563 Publication discloses reinforcing the mounting portion by providing a low elasticity member less elastic than the mounting thread between the mounting thread and the leg of the line guide.

However, a reinforcing member in the '841 Publication is fixed with the mounting thread for mounting the fitting. Therefore, the reinforcing member is placed between the mounting thread and the leg of the fitting. Since the leg of the line guide is not directly fastened with the mounting thread, fixing of the fitting on the rod body is prone to loosen. Also, in the '563 Publication, the low elasticity member for reinforcement is placed between the mounting thread and the leg of the fitting; therefore, fixing of the fitting on the rod body is likewise prone to loosen.

SUMMARY

To overcome this problem, one object of the present invention is to provide a fishing rod wherein a fitting can be stably fixed on a rod body with a mounting thread and cracking in a resin layer is less visible to a user.

Further, in fishing rods having such a fitting, a large load imparted from the fishing line onto the fitting may cause a force to be imparted on the mounting portion in a direction away from the rod body. Therefore, as pointed out in the '841 Publication and the '563 Publication, cracking may occur in the resin layer coating the mounting portion.

To overcome this problem, one object of the present invention is to provide a fishing rod wherein a fitting can be fixed on a rod body more securely. Other objects of the present invention will be apparent with reference to the entire description in this specification.

A fishing rod according to an embodiment of the present invention includes a rod body, and a fitting mounted on the outer circumferential surface of the rod body via a mounting portion. The fitting may be any part that can be mounted on a rod body, such as a line guide or a reel seat, but is not limited thereto.

The fitting includes a mounting portion. In an embodiment, a thread-like part-fixing member is wound around the mounting portion and the rod body over a predetermined width along the axial direction of the rod body. This thread-like part-fixing member is also referred to as "mounting thread." Thus, the mounting thread is wound directly on the mounting portion so as to securely fix the fitting on the rod body.

A fishing rod in an embodiment includes a cover member placed on a surface of the part-fixing member, and a resin layer provided so as to coat the part-fixing member and the cover member. In an embodiment, a resin constituting the resin layer penetrates into space in the part-fixing member (gaps between the turns of the thread).

In an embodiment, the cover member is placed above the mounting portion. For example, the cover member is placed so as to cover an entire region where the part-fixing member overlaps the mounting portion in a planar view.

In the fishing rod, a large tension on the fishing line may cause a large load imparted on the fitting. Due to bending of the rod body, a force is imparted on (particularly an end of) the mounting portion of the fitting in a direction of floating upward from the rod body so as to force aside the part-fixing member near the mounting portion, resulting in cracking in the resin layer near the mounting portion, the resin layer being formed of a resin having penetrated into the part-fixing member. In an embodiment of the present invention, the cover member is placed radially outside compared to the part-fixing member so as to cover an entire region where the part-fixing member overlaps the mounting portion in a planar view. Therefore, the portion where cracking occurs (the resin near the mounting portion) is visually hidden from the user of the fishing rod. Thus, a crack would be visually unrecognizable to the user of the fishing rod.

In an embodiment, the cover member is opaque. A crack occurring near the mounting portion is masked with the cover member and hidden from the user of the fishing rod.

It may seem that upon cracking in the resin layer coating the mounting thread, there is deficiency in mounting strength of the fitting on the rod body; but actually the fitting is securely fixed with the mounting thread and thus there is almost no impact of the crack on use of the fishing rod. However, cracking is still a problem that needs to be solved because some users of the fishing rod recognize a crack as causing deficiency in mounting strength of the fitting. Embodiments of the present invention are intended to solve the problem by a unique way of making a crack visually unrecognizable to a user of the fishing rod in addition to preventing the occurrence of the crack. More specifically, a cover member is placed so as to cover an entire region where the part-fixing member overlaps the mounting portion, thereby to reinforce the mounting portion and its surroundings and make a crack less visible to a user of the fishing rod. Thus, the present invention has an idea largely different from those of related arts quoted herein.

In an embodiment, the cover member can be fixed on the rod body by winding a thread-like cover-fixing member around the cover member and the rod body.

The method of fabricating a fishing rod according to an embodiment of the present invention comprises the steps of: placing a mounting portion of a fitting on an outer circumferential surface of a rod body; winding a thread-like part-fixing member around the mounting portion and the rod body across a predetermined width in an axial direction of the rod body; placing a cover member on a surface of the part-fixing member above the mounting portion; providing a resin layer so as to coat the part-fixing member and the cover member.

A fishing rod according to an embodiment of the present invention includes a rod body, a sheet member, a fitting including a mounting portion, a thread-like part-fixing member wound around the mounting portion and the rod body, and a resin layer coating the part-fixing member and the sheet member. The fitting may be any part that can be mounted on the rod body, such as a line guide or a reel seat, but is not limited thereto.

In an embodiment, a sheet member includes a first region and a second region and fixed on a predetermined position in an outer circumferential surface of the rod body via the first region. In an embodiment, the fitting is placed such that the mounting portion is on the surface of the first region of the sheet member. In an embodiment, at least the first region of the sheet member is soaked with an adhesive.

In an embodiment, the part-fixing member, also referred to as a mounting thread, is a thread-like member wound around the mounting portion of the fitting and the rod body across a predetermined width in the axial direction of the rod body.

In an embodiment, the sheet member is bent at a border between the first region and the second region such that the second region covers a surface of the part-fixing member. In an embodiment, the sheet member is placed such that the second region covers an entire region where the part-fixing member overlaps the mounting portion in a planar view. In an embodiment, the sheet member is an isotropic film. In an embodiment, the sheet member is fixed on the rod body with a thread-like cover-fixing member wound around the rod body. In an embodiment, the sheet member may be opaque.

A method of fabricating a fishing rod according to an embodiment of the present invention comprises the steps of: placing a sheet member including a first region and a second region such that the first region is on an outer circumferential surface of a rod body; placing a fitting including a mounting portion such that the mounting portion is on a surface of the first region of the sheet member; winding a thread-like part-fixing member around the mounting portion and the rod body; bending the sheet member at a border between the first region and the second region such that the second region covers a surface of the part-fixing member, and providing a resin layer so as to coat the part-fixing member and the sheet member.

The embodiments of the present invention provide a fishing rod wherein a fitting can be stably fixed on a rod body with a mounting thread, and cracking in a resin layer is less visible to a user. Further, the embodiments of the present invention enable fixing of a fitting on a rod body more securely.

DESCRIPTION OF EXAMPLE EMBODIMENTS

Various embodiments of the present invention will be described hereinafter with reference to the drawings. In the drawings, the same components are denoted by the same reference numerals. It should be noted that the drawings do not necessarily appear in accurate scales for convenience of description.

Figure 1:
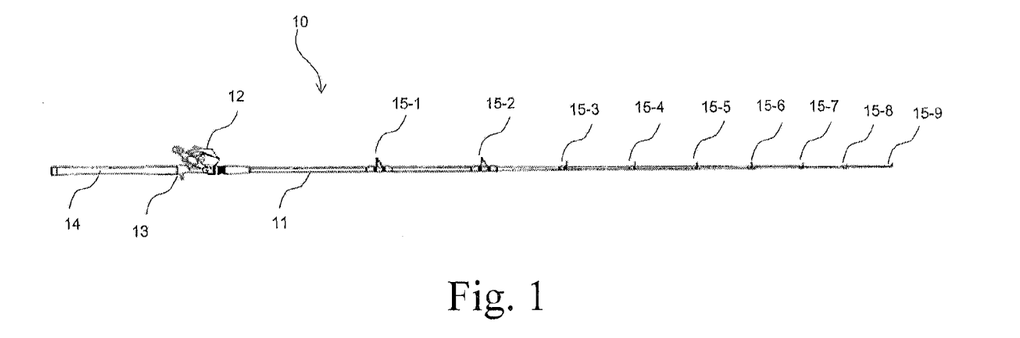
FIG. 1 schematically shows a fishing rod according to an embodiment of the present invention.

FIG. 1 schematically shows a fishing rod according to an embodiment of the present invention. As shown, the fishing rod 10 according to an embodiment of the present invention may include an elongated rod body 11, a reel 12 removably mounted on the rod body 11 via a reel seat 13, and a grip 14 mounted on the proximal end side of the rod body 11. Herein, the grip 14 side of the rod body 11 is referred to as "rear," and the rod tip side of the rod body 11 is referred to as "front." The top of FIG. 1 (on the side where the reel 12 is mounted) is referred to as "top," the side opposite thereto is referred to as "bottom," the side close to a viewer in FIG. 1 is referred to as "right," and the side far from the viewer in FIG. 1 is referred to as "left."

The rod body 11 may have at least one line guide mounted thereon. In the example shown in FIG. 1, nine line guides 15-1 to 15-9 may be mounted on the rod body 11. The fishing line (not shown) released from a reel 3 may be guided to the rod tip of the rod body 11 by the line guides 15-1 to 15-9. The line guide 15-1, positioned most proximal to the angler, may be referred to as "a bottom guide." On the other hand, the line guide 15-9, positioned most distal to the angler, may be referred to as "a top guide." Herein, the line guides 15-1 to 15-9 are collectively referred to as line guides 15.

In FIG. 1, the reel 12 may be a bait casting reel. As shown, the bait casting reel may typically be mounted on the top of the outer circumferential surface of the rod body 11. If the reel 12 is mounted on the top of the outer circumferential surface of the rod body 11, the line guides 15-1 to 15-9 for guiding a fishing line may also be mounted on the top of the outer circumferential surface of the rod body 11. The reel 12 may be various types of reels other than a bait casting reel such as various types of spinning reels. Since a spinning reel is typically mounted on the bottom of the outer circumferential surface of the rod body 11, the line guides 15-1 to 15-9 may also be mounted on the bottom of the outer circumferential surface of the rod 11.

Figure 2:
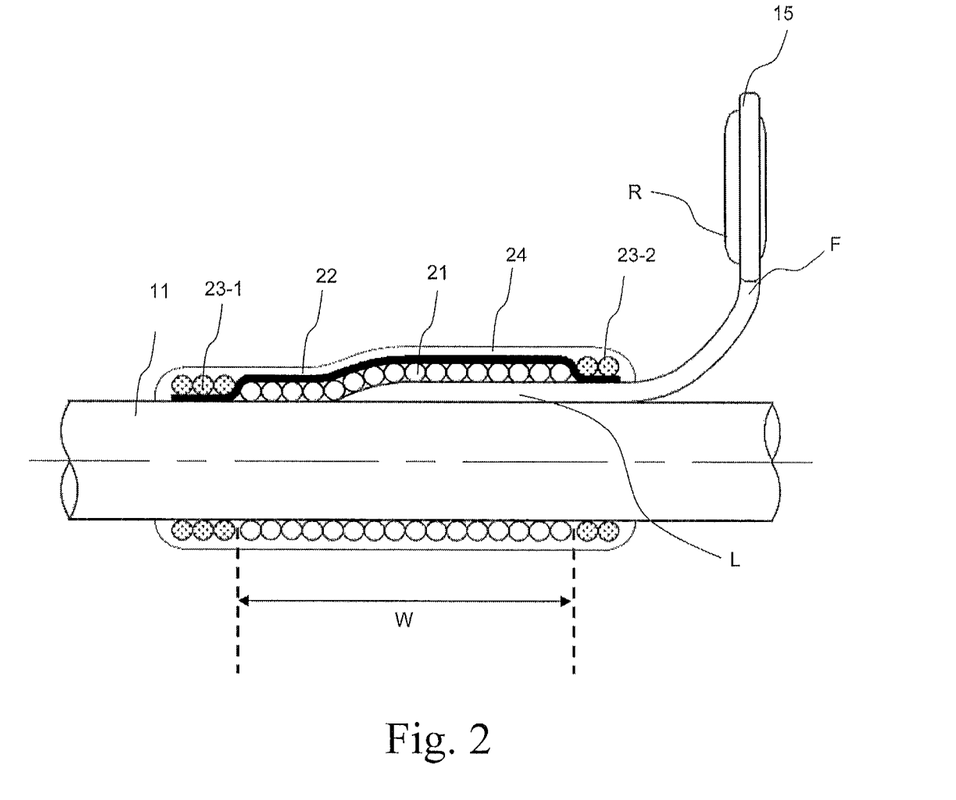
FIG. 2 is an enlarged sectional view around a line guide of a fishing rod according to the embodiment of the present invention.

The line guides applicable to the present invention will be described in further details with reference to FIG. 2. FIG. 2 is a sectional view of the rod body 11 having the line guides 15 mounted thereon. As shown, the line guides 15 according to an embodiment of the present invention may include a mounting portion L (also referred to as "leg L") to be mounted on the rod body 11, a tabular frame F connected to the front end of the leg L, and a guide ring R fitted in a through hole formed in the frame F. The line guides 15 may be of the single-foot type, which can be mounted on the rod body on its single leg extending proximally toward the butt end of the rod body 11, or of the double-foot type, which has a pair of legs one extending frontward and the other rearward. FIGS. 2 to 8 show examples of the line guides of the single-foot type. Herein, description is based on the line guides of the single-foot type; but the present invention can be applied to line guides of both the single-foot type and the double-foot type.

The first step to mount a line guide 15 on the rod body 11 may be to place the leg L at a predetermined position on the outer circumferential surface of the rod body 11. Then, the mounting thread 21 may be tightly wound around the rod body 11 and the leg L placed on the outer circumferential surface of the rod body 11. Thus, the leg L may be fastened on the rod body 11 with the mounting thread 21. The mounting thread 21 may be wound across a predetermined width W along the axial direction of the rod body 11. The predetermined width W can be appropriately varied in accordance with the length of the leg L and the fixing strength required. The mounting thread 21 should preferably be wound around at least a portion near the end of the leg L. This arrangement may prevent the end of the leg L from floating upward from the rod body 11 upon bending of the rod body 11. The mounting thread 21 may be a thread of natural fibers (e.g., cotton thread), a thread of regenerated fibers, or a thread of chemical fibers such as Nylon, but the threads applicable to the present invention are not limited to the examples listed herein.

On the surface of the mounting thread 21 (on the radial outside of the mounting thread 21) may be provided a cover member 22. The cover member 22 may be in any form such as a tape, film, sheet, or fabric cloth. The cover member 22 in an embodiment may include a plurality of threads arranged along the axial direction of the rod body 11. The cover member 22 in an embodiment may be an isotropic film (isotropic sheet) having substantially the same tensile strength in any directions in the sheet surface. The isotropic film may be various films (sheets) obtained by calendermolding of a high molecular compound such as polyurethane, polyester, or polyvinyl chloride. The cover member 22 may include a reinforcement material constituted by various short fibers. The cover member 22 may be formed of randomly arranged fibers constituted by a plurality of threads arranged in random directions. Further, the cover member 22 may be a sheet of Japanese paper.

Figure 3:
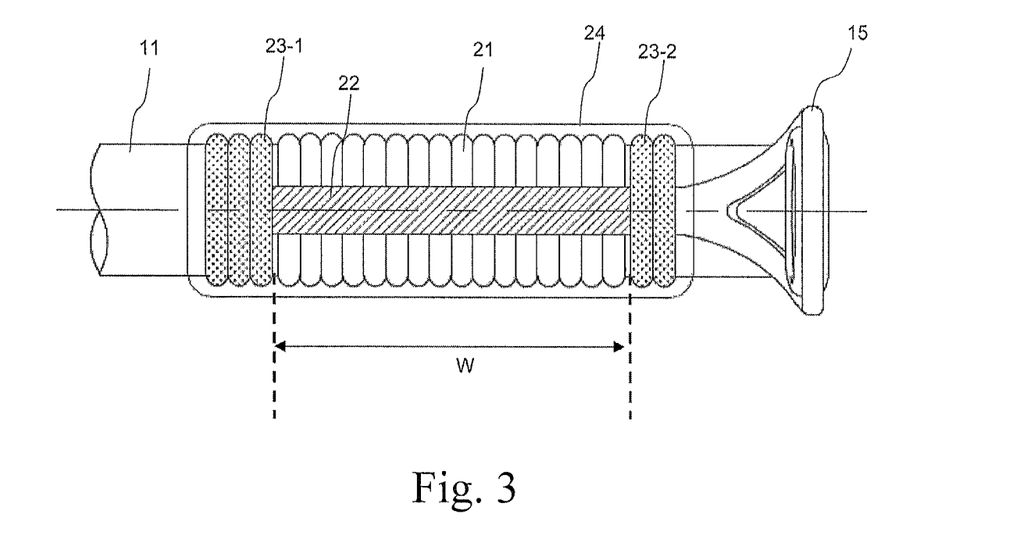
FIG. 3 is an enlarged plane view around a line guide of a fishing rod according to the embodiment of the present invention.

In an embodiment as shown in FIG. 3, the cover member 22 may be provided above the leg L of the line guide 15. In an embodiment, the cover member 22 may have a left right width larger than that of the leg L. Further, the cover member 22 in an embodiment may have a front-rear length larger than the width W across which the mounting thread 21 may be wound. Thus, the cover member 22 in an embodiment may extend so as to cover the entire region where the mounting thread 21 overlaps the leg L in a planar view (as viewed from the direction in FIG. 3).

The cover member 22 in an embodiment may have such a transmittance that the objects (the mounting thread 21 and a resin penetrating between the turns of the mounting thread 21) placed therebeneath (radially inside) are not visible to the user of the fishing rod 10. Further, the cover member 22 may be opaque.

A mounting thread 23-1 for the cover member may be wound around the rod body 11 and the rear end of the cover member 22 placed in position, and another mounting thread 23-2 for the cover member may be wound around the rod body 11 and the front end of the cover member 22, so as to fix the cover member 22 on the rod body 11. The mounting threads 23-1, 23-2 for the cover member may be formed of either the same material as or a different material than the mounting thread 21. Further, both the mounting threads 23-1, 23-2 for the cover member may be constituted by one thread.

If as shown in FIG. 2 the front-rear length of the cover member 22 is longer than the width W across which the mounting thread 21 is wound, the mounting threads 23-1, 23-2 for the cover member may be wound around regions at the front end and the rear end of the cover member 22 where the mounting thread 21 is not present. Since the cover member 22 may be directly fastened on the rod body 11 (or the leg L fixed on the rod body), the cover member 22 can be stably fixed on the rod body 11.

Figure 4:
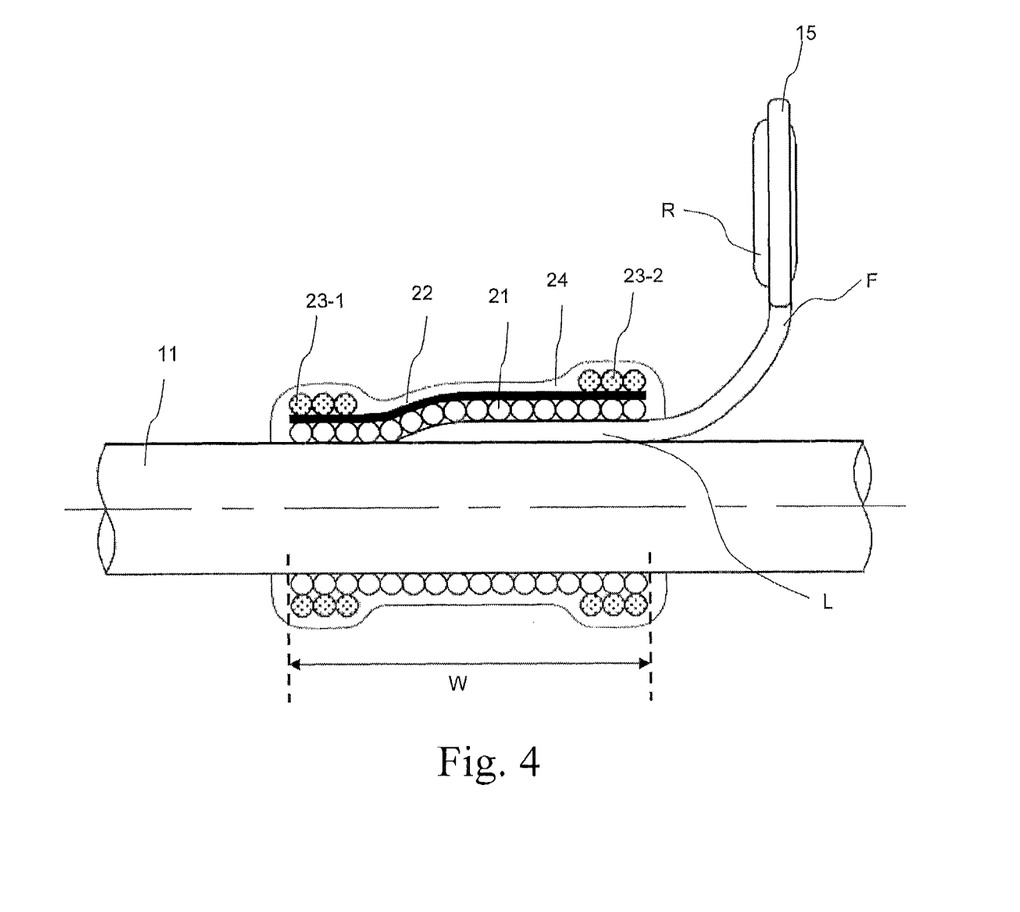
FIG. 4 is an enlarged sectional view around a line guide of a fishing rod according to another embodiment of the present invention.
Figure 5:
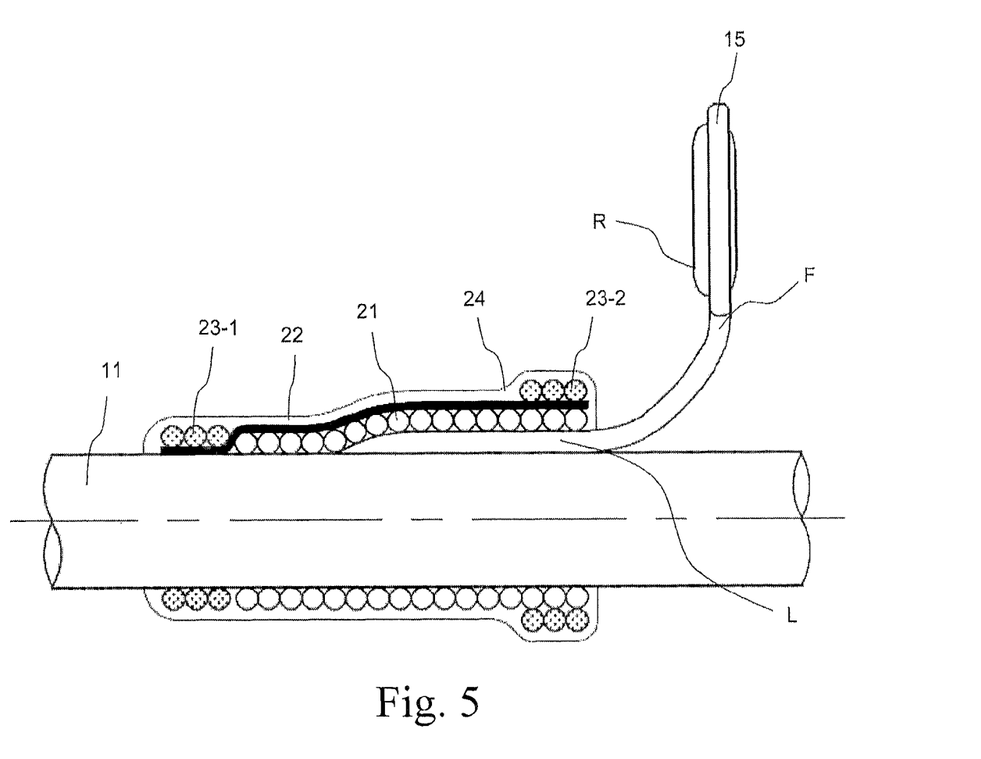
FIG. 5 is an enlarged sectional view around a line guide of a fishing rod according to another embodiment of the present invention.

If as shown in FIG. 4 the front-rear length of the cover member 22 is substantially equal to the width W across which the mounting thread 21 is wound, the mounting threads 23-1, 23-2 for the cover member may be wound around regions where the cover member 22 overlaps the mounting thread 21. In this case, the resin layer 24 can be shorter in the axial direction as compared to the embodiment shown in FIG. 2. In another embodiment of the present invention as shown in FIG. 5, the rear end of the cover member 22 may be directly fixed on the rod body 11, and the front end of the same may be fixed on the rod body 11 via the mounting thread 21 (and the leg L). Additionally, it may also be possible that the rear end of the cover member 22 is fixed on the rod body 11 via the mounting thread 21, and the rear end of the same is directly fixed on the leg L.

In an embodiment, the resin layer 24 may be provided so as to coat the mounting thread 21 and the cover member 22. The resin layer 24 may be formed of various resins such as epoxy, urethane, or UV-curable resins (e.g., urethane acrylate, acrylic resin acrylate, epoxy acrylate). The materials of the resin layer 24 is not limited to those named herein but may be various. The resin layer 24 may be either transparent or colored. Since the resin constituting the resin layer 24 may penetrate between the turns of the mounting thread 21, the leg L can be mounted on the rod body 11 more securely. As shown, the resin layer 24 may coat the mounting threads 23-1, 23-2 for the cover member.

In the above fishing rod 11, the mounting thread 21 may be directly wound on the leg L of the line guide 15; therefore, the line guide 15 can be fixed on the rod body 11 more securely as compared to fishing rods wherein an object (such as a reinforcing member) is interposed between the mounting thread and the mounting portion of the fitting. Further, since the cover member 22 is placed on the surface of the mounting thread 21 above the leg L, a crack occurring in the resin near the leg L is less visible to the user of the fishing rod 10. Particularly when the cover member 22 is opaque, the crack is invisible to the user.

The fittings mounted on the rod body 11 with the mounting thread is not limited to the line guides described above. For example, a reel seat 13 is one example of the fittings mounted on the rod body 11 with the mounting thread. The reel seat 13 may include a fixed hood housing the front leg of the reel and a movable hood housing the rear leg of the reel and movable in the axial direction of the rod body 11. The reel seat 13 may be configured in the same way as the reel seat (tabular reel seat 5) disclosed in Japanese Patent Application Publication No. 2008-263841. As the line guides, the reel seat 13 may be fixed on the rod body 11 with the mounting thread 21, the cover member 22, the mounting threads 23-1, 23-2 for the cover member, and the resin layer 24.

In the fishing rod 10 according to an embodiment of the present invention, a fitting (e.g., line guides or a reel seat) can be stably fixed on the rod body with the mounting thread, and a crack occurring in the resin layer penetrating between the turns of the mounting thread can be made less visible to the user.

Figure 6:
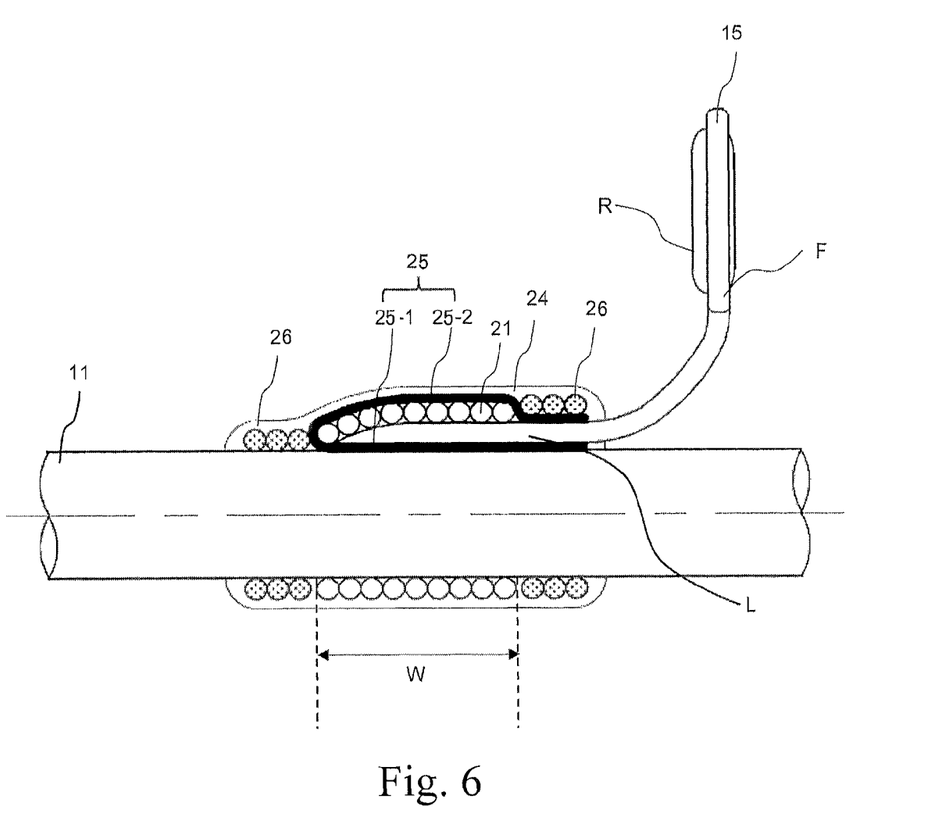
FIG. 6 is an enlarged sectional view around a line guide of a fishing rod according to an embodiment of the present invention.

The line guides applicable to the present invention will be described in further details with reference to FIG. 6. FIG. 6 is a sectional view of the rod body 11 having the line guides 15 mounted thereon.

The first step to mount a line guide 15 on the rod body 11 may be to place a sheet member 25 at a predetermined position on the outer circumferential surface of the rod body 11. The sheet member 25 may include a first region 25-1 and a second region 25-2, and the first region may be placed on the outer circumferential surface of the rod body 11. The first region 25-1 of the sheet member 25 may be fixed on the outer circumferential surface of the rod body 11 with an adhesive for example.

The sheet member 25 may be in any form such as a tape, film, sheet, or fabric cloth. The sheet member 25 in an embodiment may include a plurality of threads arranged along the axial direction of the rod body 11. The sheet member 25 in an embodiment may be an isotropic film (isotropic sheet) having substantially the same tensile strength in any directions in the sheet surface. The isotropic film may be various films (sheets) obtained by calender-molding of a high molecular compound such as polyurethane, polyester, or polyvinyl chloride. The cover member 22 may include a reinforcement material constituted by various short fibers. The cover member 22 may be formed of randomly arranged fibers constituted by a plurality of threads arranged in random directions. Further, the cover member 22 may be a sheet of Japanese paper.

Next, the leg L of a line guide 15 may be placed on the surface of the first region 25-1 of the sheet member 25 (the surface opposite to the surface contacting the rod body 11). Then, the mounting thread 21 may be tightly wound around the leg L and the rod body 11. Thus, the leg L may be fastened on the rod body 11 with the mounting thread 21 via the first region 25-1 of the sheet member 25. The mounting thread 21 may be a thread of natural fibers (e.g., cotton thread), a thread of regenerated fibers, or a thread of chemical fibers such as Nylon, but the threads applicable to the present invention are not limited to the examples listed herein.

In an embodiment, the sheet member 25 may be formed of a material permeable to an adhesive or a resin. Accordingly, the leg L, placed on the first region 25-1 to which an adhesive is applied, may be securely fixed on the rod body 11 via the adhesive applied to the first region.

Figure 8:
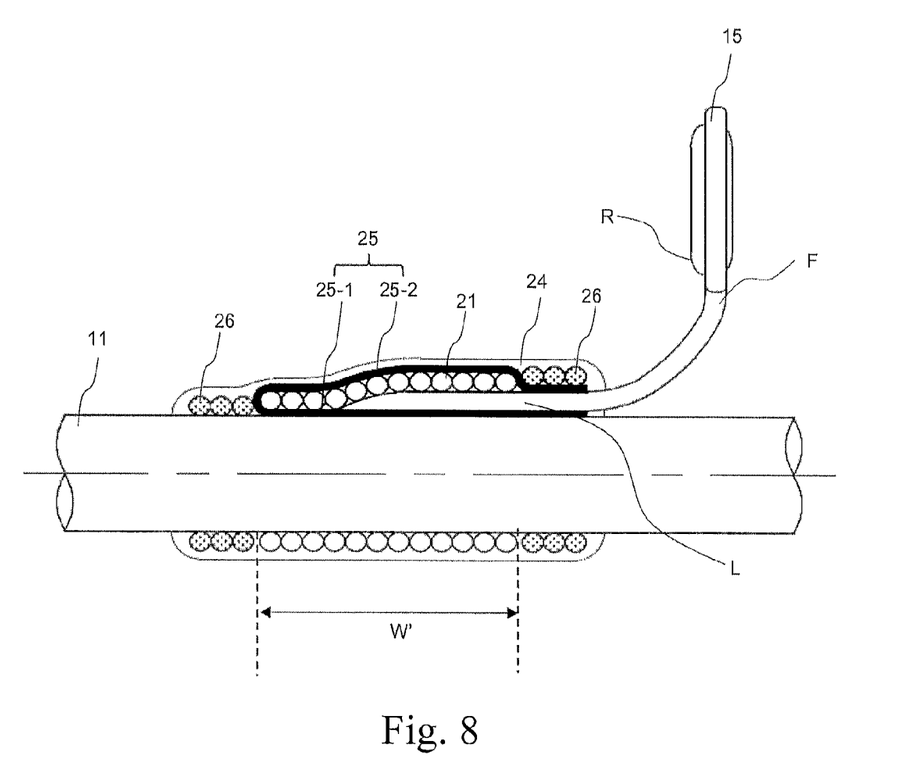
FIG. 8 is an enlarged sectional view around a line guide of a fishing rod according to another embodiment of the present invention.

The mounting thread 21 may be wound across a predetermined width W along the axial direction of the rod body 11. In an embodiment as shown in FIG. 6, the mounting thread 21 may be wound from the end of the leg L across the width W in the axial direction of the rod body 11. The mounting thread 21 should preferably be wound around at least a portion near the end of the leg L. This arrangement may prevent the end of the leg L from floating upward from the rod body 11 upon bending of the rod body 11. In another embodiment as shown in FIG. 8, the mounting thread 21 may be wound from a position on the rod body 11 behind the end of the leg L across a width W' (W'>W) in the axial direction of the rod body 11. As shown in FIG. 8, the mounting thread 21 may be wound from a position behind the end of the leg L, and the mounting thread 21 and the sheet member 25 may extend beyond the end of the leg L; thus, the leg L can be fixed on the rod body 11 more securely.

Figure 7:
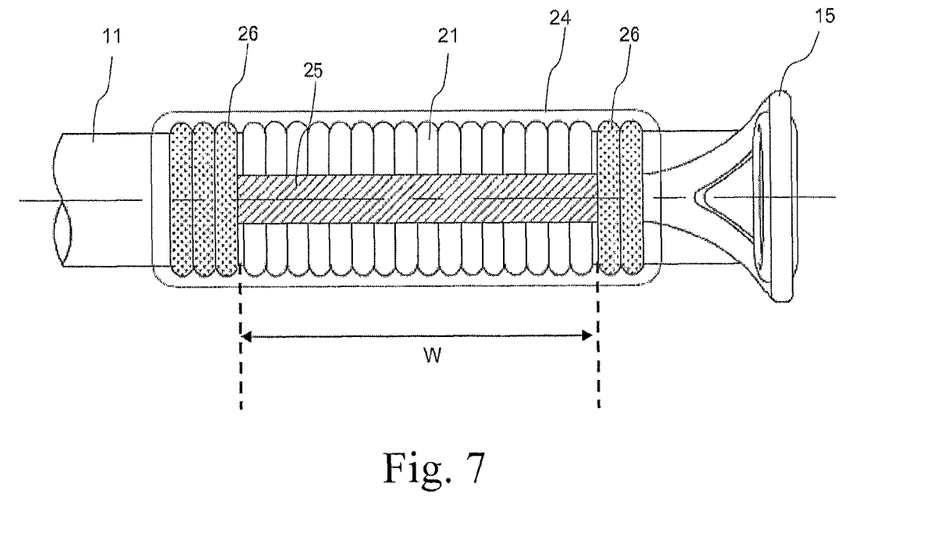
FIG. 7 is an enlarged plane view around a line guide of a fishing rod according to the embodiment of the present invention.

After the mounting thread 21 is wound as described above, the sheet member 25 may be bent frontward at the border between the first region 25-1 and the second region 25-2 such that the second region 25-2 covers the surface of the mounting thread 21 (on the radial outside of the mounting thread 21). As shown in FIG. 7, the sheet member 25 may be provided above the leg L of the line guide 15. In an embodiment, the sheet member 25 (at least one of the first region 25-1 and the second region 25-2) may be formed so as to have a left right width larger than the width of the leg L. Further, the second region 25-2 in an embodiment may have a front-rear length larger than the width W across which the mounting thread 21 may be wound. Thus, as shown in FIG. 7, the second region 25-2 in an embodiment may extend so as to cover the entire region where the mounting thread 21 overlaps the leg L in a planar view (as viewed from the direction in FIG. 7).

The sheet member 25 in an embodiment may have such a transmittance that the objects (the mounting thread 21 and a resin penetrating between the turns of the mounting thread 21) placed therebeneath (radially inside) are not visible to the user of the fishing rod 10. In an embodiment, the sheet member 25 is opaque.

In an embodiment, a mounting thread 26 for the sheet member may be wound on a part of the sheet member 25 to fix the sheet member 25 arranged as above. The mounting thread 26 for the sheet member may be formed of either the same material as or a different material than the mounting thread 21.

In an embodiment, the resin layer 24 may be provided so as to coat the mounting thread 21 and the sheet member 25. The resin layer 24 may be formed of various resins such as epoxy, urethane, or UV-curable resins (e.g., urethane acrylate, acrylic resin acrylate, epoxy acrylate). The materials of the resin layer 24 is not limited to those named herein but may be various. The resin layer 24 may be either transparent or colored. Since the resin constituting the resin layer 24 may penetrate between the turns of the mounting thread 21, the leg L can be mounted on the rod body 11 more securely. As shown, the resin layer 24 may coat the mounting thread 26 for the sheet member.

In the fishing rod 10 described above, the sheet member 25 may extend from beneath (radially inside) the leg L of the line guide 15 onto the top (radial outside) of the leg L so as to turn around the end of the leg L; therefore, the leg L can be securely fixed on the rod body 11. The end of the leg L may be held down by the second region 25-2 of the sheet member 25 thereabove, and the second region 25-2 may be formed integrally with the first region 25-1 tightly adhered to the rod body 11; therefore, even when a large load is imparted on the line guide 15 from the fishing line to apply a force on the end of the leg L in the direction away from the rod 11, the leg L may be forced down (in the direction toward the rod body 11), thus preventing the end of the leg L from floating upward from the rod body 11.

The fittings mounted on the rod body 11 with the mounting thread is not limited to the line guides described above.

For example, a reel seat 13 is one example of the fittings mounted on the rod body 11 with the mounting thread. The reel seat 13 may include a fixed hood housing the front leg of the reel and a movable hood housing the rear leg of the reel and movable in the axial direction of the rod body 11. The reel seat 13 may be configured in the same way as the reel seat (tabular reel seat 5) disclosed in Japanese Patent Application Publication No. 2008-263841. As the line guides, the reel seat 13 may be fixed on the rod body 11 with the mounting thread 21, the sheet member 25, the mounting thread 26 for the sheet member, and the resin layer 24.

In the fishing rod 10 according to an embodiment of the present invention, a fitting (e.g., line guides or a reel seat) can be stably fixed on the rod body with the mounting thread, and a crack occurring in the resin layer penetrating between the turns of the mounting thread can be made less visible to the user.

The dimensions, material, and arrangement of the elements described herein are not limited to those explicitly described for the embodiments. The elements are susceptible of modifications for desired dimensions, materials, and arrangements within the scope of the present invention. The elements other than those explicitly described herein can be added to the described embodiments; and part of the elements described for the embodiments can be omitted.

What is claimed is:

1. A fishing rod comprising:
    a rod body;
    a sheet member including a first region and a second region and fixed on an outer circumferential surface of the rod body via the first region;
    a fitting including a mounting portion placed on a surface of the first region of the sheet member;
    a thread-like part-fixing member comprising threads wound around the mounting portion and the rod body; and
    a resin layer coating the part-fixing member and the sheet member,
    wherein the sheet member is bent at a border between the first region and the second region such that a first portion of threads from the part-fixing member is provided in front of a bend of the sheet member and that the second region covers a surface of a second portion of threads of the part-fixing member such that the second portion of threads is provided between the first region and second region of the sheet member.

2. The fishing rod of claim 1 wherein at least the first region of the sheet member is soaked with an adhesive or a resin.

3. The fishing rod of claim 1 wherein the sheet member is placed such that the second region covers an entire region where the part-fixing member overlaps the mounting portion in a planar view.

4. The fishing rod of claim 1 wherein the fitting is a line guide.

5. The fishing rod of claim 1 wherein the fitting is a reel seat.

6. The fishing rod of claim 1 wherein the sheet member is constituted by an isotropic film or randomly oriented fibers.

7. The fishing rod of claim 1 further comprising a thread-like cover-fixing member wound around the sheet member and the rod body.

8. The fishing rod of claim 1 wherein the sheet member is opaque.

9. A method of fabricating a fishing rod, comprising the steps of:
    placing a sheet member including a first region and a second region such that the first region is on an outer circumferential surface of a rod body;
    placing a fitting including a mounting portion such that the mounting portion is on a surface of the first region of the sheet member;
    winding a thread-like part-fixing member around the mounting portion and the rod body;
    bending the sheet member at a border between the first region and the second region such that the second region covers a surface of the part-fixing member, and
    providing a resin layer so as to coat the part-fixing member and the sheet member,
    wherein the winding of the thread-like part-fixing member and the bending the sheet member include providing a first portion of threads from the part-fixing member in front of a bend of the sheet member and a second portion of threads between the first region and second region of the sheet member.

* * * * *